Patented Feb. 18, 1941

2,231,936

UNITED STATES PATENT OFFICE 2,231,936

CARBONIC ACID ESTER OF 1,2 DI-(PARA-HYDROXYPHENYL) 1,2-DIETHYL ETHYLENE

Heinrich Medick, Wuppertal-Elberfeld, Germany, assignor to Winthrop Chemical Company, Inc., New York, N. Y., a corporation of New York No Drawing. Application February 3, 1940, Serial No. 317,132. In Germany February 11, 1939

3 Claims. (Cl. 260—463)

This invention relates to ethylene compounds.

Certain ethylene compounds, such as 1,2-di-(para-hydroxyphenyl)-1,2-diethyl-ethylene, its diacetate and its di-propionate are known by their good oestrus activity. Efforts have been made to still improve the therapeutic properties of the said compounds, but so far the new compounds prepared were not equal to the aforementioned compounds, for instance to the di-propionate as to their therapeutic properties.

In accordance with the present invention new products which are distinguished by a good compatibility and a prolonged and increased activity are obtainable by the manufacture of the mixed lower alkyl carbonic acid esters of 1,2-di-(para-hydroxyphenyl)-1,2-diethyl-ethylene of the formula

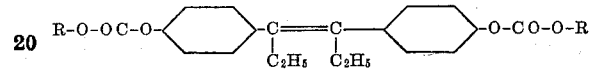

wherein R stands for a lower alkyl group. The improved properties of the said mixed lower alkyl carbonic acid esters are most surprising in view of the known fact that mixed carbonic acid esters of phenols are hydrolized particularly readily. Therefore, it was to be expected that the said mixed lower alkyl carbonic acid esters of the ethylene compound specified would be similar to the free phenol compound as to their therapeutic activity.

In accordance with the present invention the new mixed lower alkyl carbonic acid esters of 1,2-di-(para-hydroxyphenyl)-1,2-diethyl-ethylene are obtainable by esterifying 1,2-di-(para-hydroxyphenyl)-1,2-diethyl-ethylene, its salts respectively, with chloro carbonic alkyl esters, if required in the presence of acid binding agents, such as alkalis, alkaline earths or organic bases, such as pyridine, quinoline, dimethyl aniline, triethylamine and the like. The reaction is carried out preferably at low temperature, say at about 0° C. The new compounds are also obtainable by reacting upon a bis-chloro carbonate of 1,2-di-(para-hydroxyphenyl)-1,2-diethyl-ethylene with a lower alcohol, with a lower metal alcoholate respectively, if required in the presence of an acid binding agent of the kind specified before. The new compounds are furthermore obtainable by converting the mixed lower alkyl carbonic acid ester of 1,2-di-(para-hydroxyphenyl)-1,2-diethyl-ethanol into the mixed lower alkyl carbonic acid esters of 1,2-di-(para-hydroxyphenyl)-1,2-diethyl-ethylene by treatment with agents capable of splitting off water.

The following examples illustrate the invention, without, however, restricting it thereto.

Example 1

2.68 grams of 1,2-di-(para-hydroxyphenyl)-1,2-diethyl-ethylene are dissolved in 40 ccs. of pyridine. The solution is cooled to a temperature of 0 to −2° C. While maintaining this temperature 12 grams of chloro-carbonic acid methyl ester are added drop by drop while vigorously shaking. The mixture is kept at 0 to 5° C. for a further hour while occasionally shaking and the reaction is completed by storing the mixture at room-temperature for 15 to 20 hours. The pyridine is removed from the mixture under diminished pressure, the residue treated with cold water and finely ground. It is filtered with suction, washed with water, $\tfrac{1}{10}$ normal sodium hydroxide solution and finally again repeatedly with water and then dried. 3.7 grams of a relatively pure bis-(mono-methyl carbonic acid ester) of the 1,2-di-(para-hydroxyphenyl)-1,2-diethyl-ethylene are obtained. After recrystallisation from alcohol the product melts at 142° C.

In the same manner also the bis-(mono-ethyl carbonic acid ester) may be obtained:

2.68 grams of 1,2-di-(para-hydroxyphenyl)-1,2-diethyl-ethylene are dissolved in 50 ccs. of pyridine and then mixed with 13 grams of chloro-carbonic acid ethyl ester at 0 to −2° C. During the reaction an oil separates. The mixture is worked up in the same manner as indicated above. 4.0 grams of the bis-(mono-ethyl carbonic acid ethyl ester) of 1,2-di(para-hydroxyphenyl)-1,2-diethyl-ethylene are obtained which melt after recrystallisation from alcohol at 118° C.

Example 2

13.4 grams of 1,2-di-(para-hydroxyphenyl)-1,2-diethyl-ethylene are dissolved in 22 ccs. of pyridine while heating. Subsequently 20 grams of chloro carbonic acid ethylester are added drop by drop while stirring at 70° C. so that the temperature of the reaction mixture does not essentially exceed 70° C. The mixture is heated for further 2 hours to 70–75° C. and then poured into 30 ccs. of ice-water while vigorously stirring. After solidifying the product precipitated is filtered with suction and freed from the pyridine by repeated washing with 2.5% hydrochloric acid. The acid is removed by washing out with water and the reacting product is redissolved from alcohol. After an eventually repeated recrystallisation the bis-ethyl carbonic acid ester of the 1,2 - di - (para-hydroxyphenyl) -1,2-diethyl-ethylene obtained melts at 118° C.

In a corresponding manner when using the chloro carbonic acid isopropylester the bis-isopropyl carbonic acid ester of the afore-mentioned phenol is obtained melting at 121° C. and the bis-primary-isobutyl carbonic acid ester melting at 124° C.

Instead of using pyridine also an aqueous solution and the sodium salt of the phenol compound may be used or sodium hydroxide solution may be added to the reaction mixture corresponding to the addition of the chloro carbonic acid ester.

I claim:

1. A compound of the formula

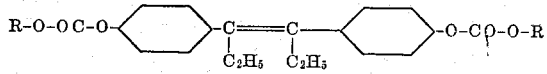

wherein R stands for a lower alkyl group.

2. The compound of the formula

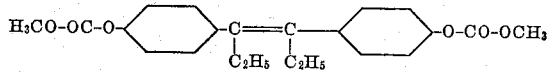

3. The compound of the formula

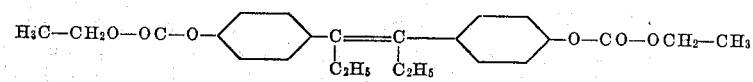

HEINRICH MEDICK.